United States Patent [19]

King et al.

[11] Patent Number: 5,724,948
[45] Date of Patent: *Mar. 10, 1998

[54] BIOGAS DRIVEN GENERATOR SET

[75] Inventors: James L. King, Sheboygan; Timothy Mintner, Elkhart Lake, both of Wis.

[73] Assignee: Kohler Co., Kohler, Wis.

[*] Notice: The term of this patent shall not extend beyond the expiration date of Pat. No. 5,501,185.

[21] Appl. No.: 724,199

[22] Filed: Oct. 1, 1996

Related U.S. Application Data

[60] Provisional application No. 60/004,734, Dec. 2, 1995.
[51] Int. Cl.$^6$ .................................... F02M 21/04
[52] U.S. Cl. .................... 123/527; 123/196 R; 123/1 A
[58] Field of Search .................. 123/73 AD, 527, 123/1 A, 196 R

[56] References Cited

U.S. PATENT DOCUMENTS 5,501,185  3/1996  King et al. ..................... 123/527

FOREIGN PATENT DOCUMENTS 2 244 093 A  11/1991  United Kingdom .......... F02B 77/04

Primary Examiner—Erick R. Solis
Attorney, Agent, or Firm—Quarles & Brady

[57] ABSTRACT

A generator powered by an internal combustion engine is fueled from a source of biogas. The biogas flows through a filter which removes hydrogen sulfide and mercaptans and through a coalescer to remove water vapor. A regulator controls the biogas pressure supplied to the fuel intake of the engine carburetor, and acid-neutralizing oil is injected into the engine intake each time the engine is shut down to protect the engine from acidic constituents in the biogas.

12 Claims, 3 Drawing Sheets

BIOGAS DRIVEN GENERATOR SET

CROSS REFERENCE TO RELATED APPLICATIONS

This application is a continuation of provisional application Ser. No. 60/004,734 filed Oct. 2, 1995

FIELD OF THE INVENTION

The field of the invention is internal combustion engines fueled by biogas, and particularly, application such as electrical generator sets in which the engine is operated intermittently.

BACKGROUND OF THE INVENTION

Biogas is produced by the anaerobic digestion of hydrocarbons. Organic waste materials such as wood byproducts (wood chips, sawdust, bark, etc.), public and private landfills, food processing byproducts, waste treatment plants and farm waste, produce biogas comprised mainly of methane and carbon dioxide. Any organic waste that can be processed through an anaerobic digester will produce methane in concentrations ranging from 50% to 80%. Unfortunately, there are other constituents produced by the anaerobic digestion of hydrocarbons, some that are inert and others that can form acids with the water vapor being produced. For example, small quantities of hydrogen sulfide may be produced and form sulfuric acid, and mercaptans, which are alcohols with an SH radical, can also form sulfuric acid. Carbon dioxide, which is produced in significant amounts is an ingredient for carbonic acid.

Biogas is used commercially in three ways. First, it can be burned directly to produce heat. This is the simplest use, since the various constituents are of little concern in the combustion process. Biogas may also be filtered and pumped into natural gas pipelines for widespread distribution. And finally the biogas may be filtered and applied to fuel an internal combustion engine. This latter application is particularly useful because the engine may power a generator which produced electrical energy.

When used to fuel an internal combustion engine, the constituents in biogas can significantly shorten the useful life of the engine. This is particularly true when the engine is operated intermittently. During shutdown, the last few strokes of the engine piston intakes unburned biogas. The various acids discussed above soon form and corrode the surfaces of the cylinder walls, the piston rings, valve seats and spark plug. These acids leak by the corroded rings into the oil sump where they are pumped throughout the engine. The contaminated oil is particularly corrosive for copper and lead alloy components. As this process occurs, the engine becomes more difficult to start until it eventually fails completely.

A typical prior art biogas driven system is shown schematically in FIG. 1, where the biogas is produced in a digester 10 and stored in a vessel 12. The pressure of the biogas can vary considerably, and a regulator 14 is employed to maintain the gas pressure at a relatively constant level at the input 16 of a carburetor 18. The biogas is mixed with combustion air in the carburetor 18 and injected into the engine cylinder 20. This basic system may also include a pump which boosts the biogas pressure in applications where the pressure is less than 4 inches of water, and it may include gas filters when corrosive constituents are a known problem. For example, hydrogen sulfide can be removed using a variety of liquid absorbents and/or solid phase oxidants. Several dry processes are also available using particles of either activated carbon, molecular sieve, or iron sponge to remove the sulfide from biogas.

SUMMARY OF THE INVENTION

The present invention is a system for fueling an internal combustion engine with biogas in which a neutralizing oil is injected into the biogas intake to coat engine components and protect them from the corrosive effects of acid. More specifically, the invention includes: an internal combustion engine having an intake for receiving a mixture of biogas and air; a carburetor mixer having an air intake, a biogas intake and an output for delivering a mixture of biogas and air to the engine intake; a reservoir of acid-neutralizing oil, and means for delivering a stream of biogas to the carburetor intake and injecting acid-neutralizing oil from the reservoir into the engine intake when the engine is shut down.

A method of neutralizing acid materials in an internal combustion engine is also presented wherein a biogas is employed as a fuel source. Acid-neutralizing oil is introduced into an engine intake in a sufficient quantity to neutralize acid materials in the internal combustion engine. In a preferred manner, the acid-neutralizing oil has a total base number greater than 14; is injected into the engine for a preset time interval when the engine is shut down; is introduced by a pumping action; and the biogas is filtered prior to introduction into the engine intake.

A general object of the invention is to reduce the corrosion of engine components due to acids produced by biogas constituents. By injecting a highly basic lubricating oil into the engine intake, the surface of the engine cylinder walls and piston are coated with oil. Any acids which are formed from biogas constituents are neutralized by the basic nature of the oil, and their corrosive effects are thus reduced while the engine remains idle.

A more specific object of the invention is to heavily coat engine components with acid neutralizing oil each time the engine is shut down. A timing circuit is operated each time the operator shuts down the engine. This timing circuit keeps the engine operating for a preset time interval and energizes a pump which injects protective oil into the engine. The preset time interval is long enough to insure that all engine components are protected with oil during the subsequent idle period.

Another object of the invention is to provide a cost effective biogas filter which reduces the biogas constituents that lead to engine corrosion. Ordinary drums are used to contain a filter media and the biogas is passed through the filter media on its path to the engine. Moisture is removed from the biogas in a coalescer after passing through the filter media, and the moisture enhances the filtering operation. The useful life of the media is extended by the introduction of air into the drums by a dual action valve which also acts as a pressure relief valve.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
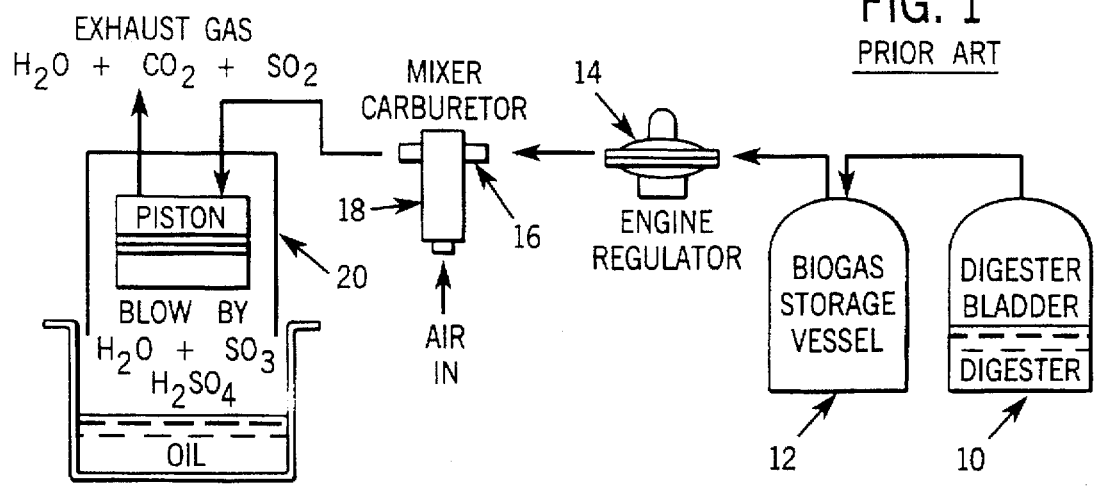
FIG. 1 is a schematic drawing of a typical prior art biogas fuel delivery system.
Figure 2:
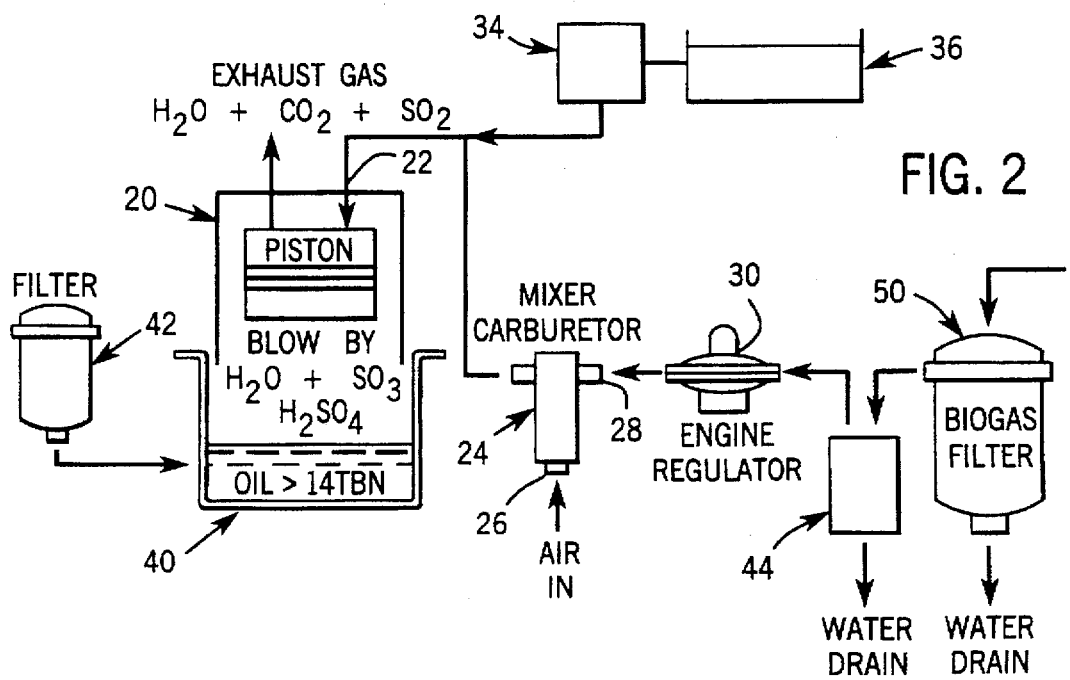
FIG. 2 is a schematic drawing of a biogas fuel delivery system according to the present invention.

Referring particularly to FIG. 2, an engine cylinder 20 has an intake 22 which receives a biogas/air mixture from a carburetor 24. The carburetor mixer 24 has an air intake 26 and a biogas intake 28 that connects to an engine gas regulator 30. The regulator 30 receives biogas at a relatively high pressure (eg. 5 to 15 inches of water) and produces a stream of biogas at its output for the carburetor 24 at a regulated pressure of 5 inches of water.

It is a teaching of the present invention that a neutralizing lubricating oil be injected into the engine intake 22 each time the engine is shut down. A reservoir 36 containing acid neutralizing oil connects to a pump 34, and neutralizing oil is injected into the engine intake 22 when the pump 34 is energized. A timing circuit (not shown) connects to the engine ignition system, and when the ignition is turned off, the timing circuit energizes the pump 34 and keeps the engine 20 running for three seconds. This is sufficient time for enough neutralizing oil to be injected to coat the surfaces of all engine cylinders. The oil has a total basic number ("TBN") that is greater than 14, and when it mixes with any acids that form from biogas constituents, they are neutralized and become far less corrosive. An oil commercially available from the Marvel Oil Company, Inc. of Port Chester, N.Y., and sold under the trademark "Marvel Mystery Oil" is used in the preferred embodiment. A neutralizing oil is also used in the engine crankcase 40 for engine lubrication, and an impregnated acid neutralizing filter 42 is used to clean the crankcase oil.

To remove water vapor from the biogas, a coalescer 44 is connected to the input of the engine gas regulator 30. Water vapor that condenses in the coalescer 44 is removed through a drain. The coalescer 44 is designed for a flow rate large enough to prevent restriction of the biogas fuel flow down to biogas pressures as low as two inches of water.

To filter the hydrogen sulfides and mercaptans out of the biogas fuel, a biogas filter 50 is connected to the input of the coalescer 44. As will be explained in more detail below, the preferred embodiment of this filter 50 is constructed of two 55 gallon drums which are filled with filter media such as "Porostone" or "Iron Sponge" commercially available from Connelly GPM, Inc. of Chicago, Ill. This filter media removes most of the hydrogen sulfides and mercaptans from the moist biogas as it flows through the filter 50.

Figure 3:
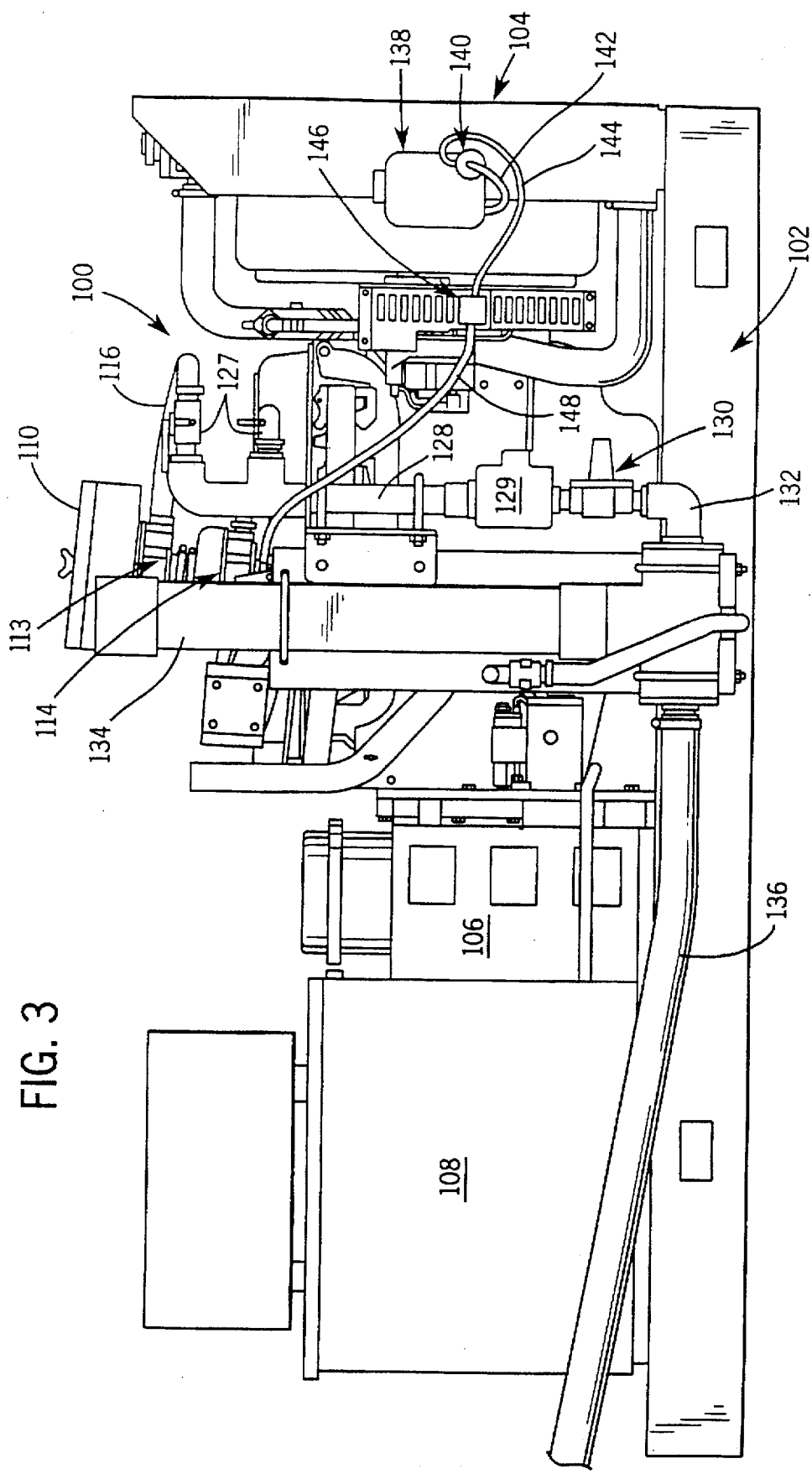
FIG. 3 is an elevation view of a generator set which employs the present invention.

In the preferred embodiment of the invention shown in FIG. 3, an internal combustion engine 100 is employed to drive an electrical generator 106. This generator set is operated when there is a sufficient supply of biogas, and then it is shut down for a period of time while the biogas supply is replenished. This intermittent engine operation has proven to be a particularly challenging situation because raw biogas is left in the engine cylinders after each shut down and acidic byproducts are produced which are highly corrosive. In a typical farm application, for example, the generator may operate for a period of four hours and then be shut down for twenty hours.

Referring particularly to FIG. 3, the generator set includes a model LSG-423 four cylinder, turbocharged engine 100 manufactured by the Ford Motor Company. The engine 100 is mounted on a frame 102 which also supports a radiator 104, an electrical generator 106 and an enclosure 108 for the associated control circuitry. The engine 100 rotates the generator shaft (not shown) and the generator 106 produces electricity that is regulated and distributed by the electronics inside the enclosure 108.

Combustion air for the engine 100 is received through an air filter 100 and is coupled to the air intake on a first carburetor/mixer 113. The carburetor/mixer 113 receives biogas fuel through intake hose 116. The output of carburetor/mixer 113 is applied to the air inlet on a second carburetor/mixer 114. The carburetor/mixer 114 also receives biogas fuel through the intake hose 116. The air/fuel mixture from the second carburetor/mixer 114 is applied to the fuel intake port of each engine cylinder. The first carburetor/mixer 113 is a model CA/25m which is commercially available from Impco Technologies, Inc. of Cerritos, Calif. and the second carburetor/mixer 114 is a model 100 also available from Impco Technologies.

The biogas is supplied to the carburetor/mixers 113 and 114 through shut-off valves 127 and a supply pipe 128 that connects to a solenoid valve 129. The solenoid valve 129 is a shut-off valve No. 821460 commercially available from ASCO Company and it is electrically operable when the engine is shut down to shut off the biogas fuel supply as quickly as possible. This minimizes the amount of unburned biogas constituents that are deposited in the engine during its idle periods. Biogas is delivered to the solenoid valve 129 by a gas regulator 130. The regulator 130 is a model ES-307 commercially available from Maxitrol Company of Southfield, Mich., and it is operable to regulate biogas pressure in the supply pipe 128 to 3 to 6 inches of water.

The regulator 130 is mounted to the frame 102 such that its diaphragm (not shown in the drawings) is oriented in a substantially vertical plane. While the diaphragm need not be vertical, it is important that the regulator 130 be mounted such that fluids in the biogas stream flowing through it will not "pool" on the diaphragm and hinder its operation.

The biogas is supplied to the regulator 130 through a pipe 132 that connects to the output of a coalescer 134. The coalescer 134 is comprised of a filter commercially available from Pall Process Filtration Company of East Hills, N.Y. As the moist biogas passes through this filter, water vapor condenses and flows out through a drain located at the bottom of the coalescer 134. The biogas fuel is fed to the coalescer 134 through a line 136.

The protective neutralizing oil used to practice the present invention is stored in a reservoir 138 mounted to the side of the radiator 104. A pump 140 is mounted to the reservoir 138 and receives oil therefrom through line 142. A pump 140 and integral reservoir 138 commercially available from J. D. Whitney & Company as stock number 17BJ9165T is employed. The output of pump 140 connects through an oil line 144 to a solenoid valve 146 mounted to the engine 100. The output of the solenoid valve is in turn connected through an oil line 148 to the output of carburetor mixer 114. The oil line 148 is connected to feed oil directly into the engine fuel intake manifold. The solenoid valve 146 is an electrically operated valve available from Blackstone Corporation as part No. 2526, which is closed to prevent neutralizing oil from being drawn into the engine while it is running.

Both the solenoid valve 146 and pump 140 are connected to the engine ignition system through a timing circuit (not shown in the drawings). When the ignition system is turned off by the operator to shut down the generator set, the timing circuit immediately opens the solenoid valve 146 and energizes the pump 140 for a period of three seconds. After this preset time period, the ignition system is deenergized, the solenoid valve 146 is closed and the oil pump 140 is turned off. During this three second interval, enough oil is pumped into the engine to lubricate each cylinder wall, rings and valve stem. This protects these engine components from the corrosive effects of biogas constituents that form while the engine is idle.

Figure 4:
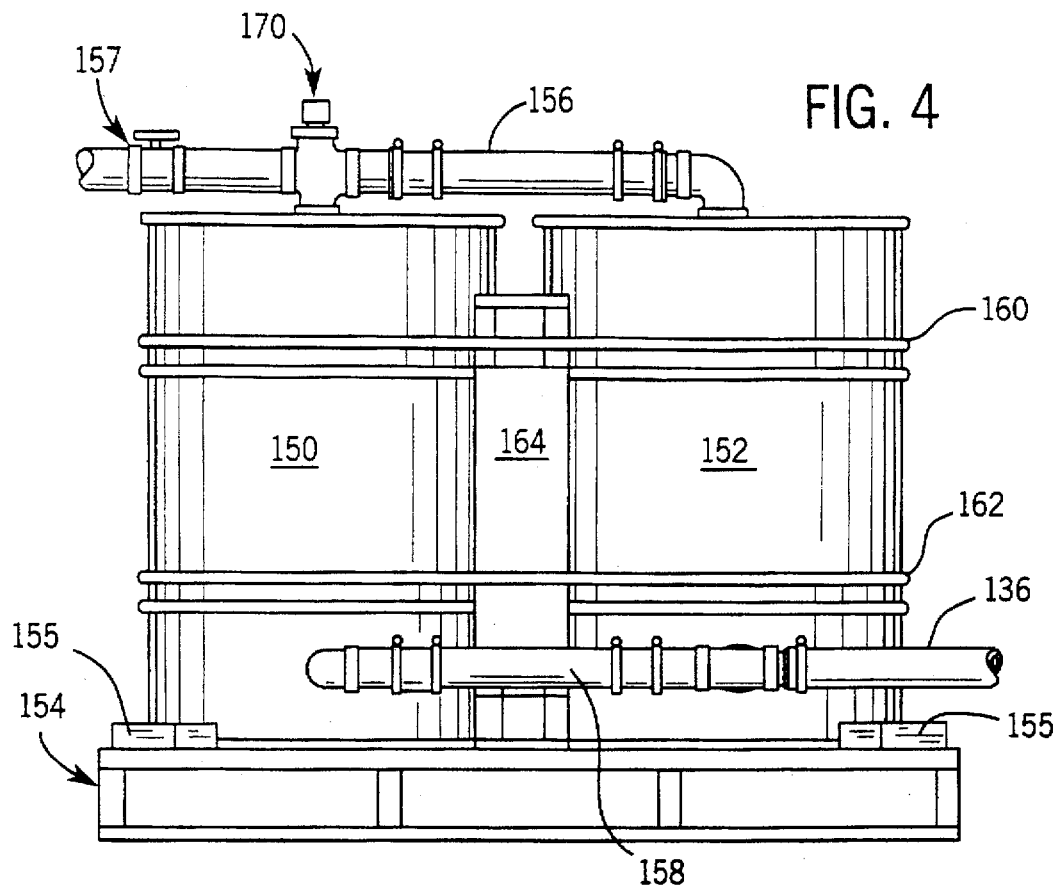
FIG. 4 is a elevation view of a preferred embodiment of the biogas filter which forms part of the system of FIG. 2.
Figure 5:
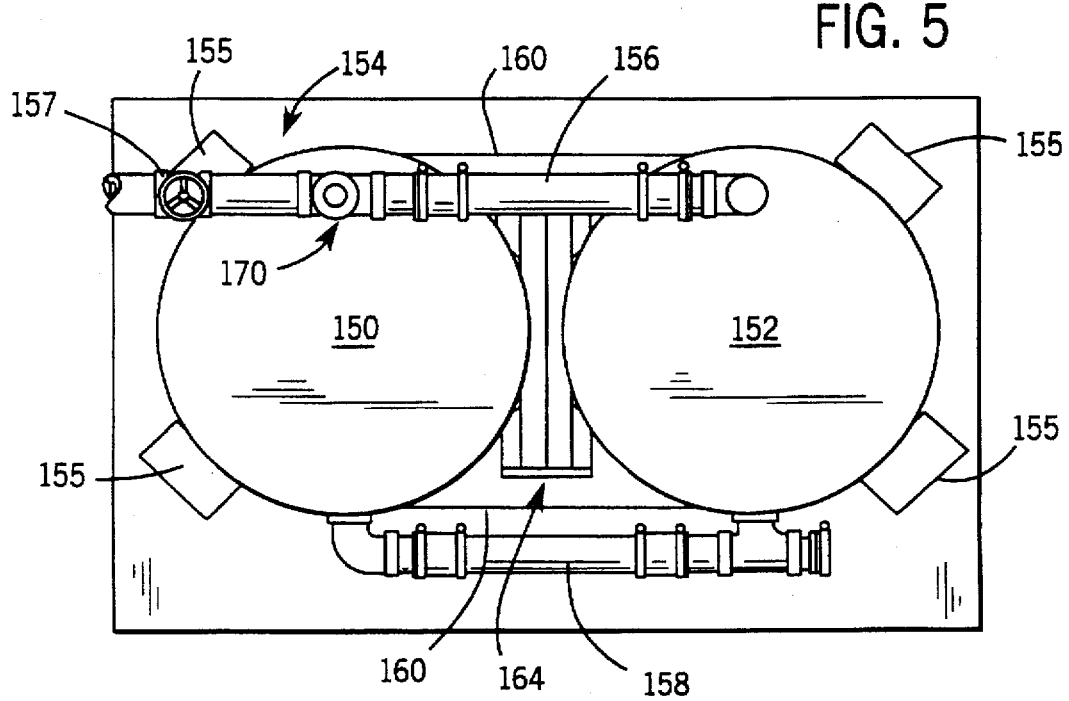
FIG. 5 is a top view of the biogas filter of FIG. 4.

Referring particularly to FIGS. 4 and 5, the biogas filter connected to supply line 136 is comprised of two 55 gallon drums 150 and 152 mounted on end to a wood shipping skid 154. The drums 150 and 152 are fastened to the skid 154 by steel bands 160 and 162 which wrap around both drums and hold them against a central wooden drum separator 164. Blocks 155 at the base of the drums 150 and 152 also provide restraint.

The drums 150 and 152 are filled with a filter media as described above, and the moist biogas is introduced at openings in the top of each drum through a two inch PVC inlet pipe 156. A shut-off valve 157 connects the pipe 156 to the biogas source. Outlets near the bottom of each drum 150 and 152 are connected to the fuel line 136 through a two inch PVC outlet pipe 158. In the preferred embodiment the filters formed by drums 150 and 152 are connected in parallel as shown to provide the needed capacity for a 30 kW generator set. It can be appreciated that additional filters can be connected in parallel or serial as may be required at the particular installation.

It is well known that the addition of approximately 2% oxygen or 5% air into the filter media will extend its useful life by a factor of three. To introduce air into the drums 150 and 152 during normal operation, a unique dual action drum vent valve 170 is connected to the intake pipe 156. The dual action valve 170 is commercially available from Global Occupational Safety National Distribution Centers as Model L1812. It performs the function of a pressure relief valve when the internal drum pressure exceeds 5 psi. In addition, however, this valve 170 allows air into the drums 150 and 152 at a rate of 4 gallons per minute. This translates to 0.5 cubic feet per minute of air which is the desired 5% for a biogas fuel rate of 10 cubic feet per minute. This is the proper rate for fuel and air for a 30 kW generator set, and when larger generator sets are powered, additional dual action valves may be used to maintain the 5% air level at the corresponding higher fuel rates.

We claim:

1. A biogas fuel supply system for providing fuel to the intake of an internal combustion engine, which comprises:

a carburetor having an air intake and a biogas intake, the carburetor being operable to mix air with a stream of biogas supplied to the carburetor biogas intake and deliver the mixture to said engine intake;

a reservoir for storing acid-neutralizing oil; and an injector coupled to the reservoir for receiving acid neutralizing oil and injecting it into the engine intake for a preset time interval when the engine is shut down.

2. The biogas fuel supply system as recited in claim 1 in which the acid-neutralizing oil has a total base number greater than 14.

3. The biogas fuel supply system as recited in claim 1 in which a regulator is connected to receive the stream of biogas and supply said stream of biogas to the carburetor at a substantially constant pressure.

4. The biogas fuel supply system as recited in claim 1 in which the injector includes a pump that is energized for the preset time interval to deliver said oil to the engine intake.

5. The biogas fuel supply as recited in claim 4 in which the injector includes a solenoid valve connected between the pump and the engine intake and which is energized during the preset time interval to allow said oil to flow.

6. The biogas fuel supply system as recited in claim 1 which includes a biogas filter coupled to supply biogas to the biogas intake of the carburetor, the biogas filter including:

a drum containing the filter material and having an input opening located at the top of the drum and an output opening located at the bottom of the drum; and a valve coupled to the drum for enabling air to enter the drum as biogas flows therethrough to extend the useful life of the filter material therein.

7. The biogas fuel supply system as recited in claim 6 in which the valve is a dual action valve that also operates to relieve pressure in the drum when the pressure exceeds a preset amount.

8. A method of neutralizing acid materials in an internal combustion engine wherein a biogas is employed as a fuel source comprising:

introducing an acid-neutralizing oil into an engine intake in a sufficient quantity to neutralize acid materials in the internal combustion engine.

9. The method as defined in claim 8, wherein the acid-neutralizing oil has a total base number greater than 14.

10. The method as defined in claim 8, wherein the acid-neutralizing oil is injected into the engine intake for a preset time interval when the engine is shut down.

11. The method as defined in claim 8, wherein the acid-neutralizing oil is introduced into the engine by a pumping action.

12. The method as defined in claim 8, wherein the biogas is introduced into the engine intake and is filtered prior to introduction.

* * * * *